Aug. 20, 1935.  C. BUSTAMANTE  2,011,614
CUTTING AND SLITTING MACHINERY
Filed May 11, 1934  5 Sheets-Sheet 4
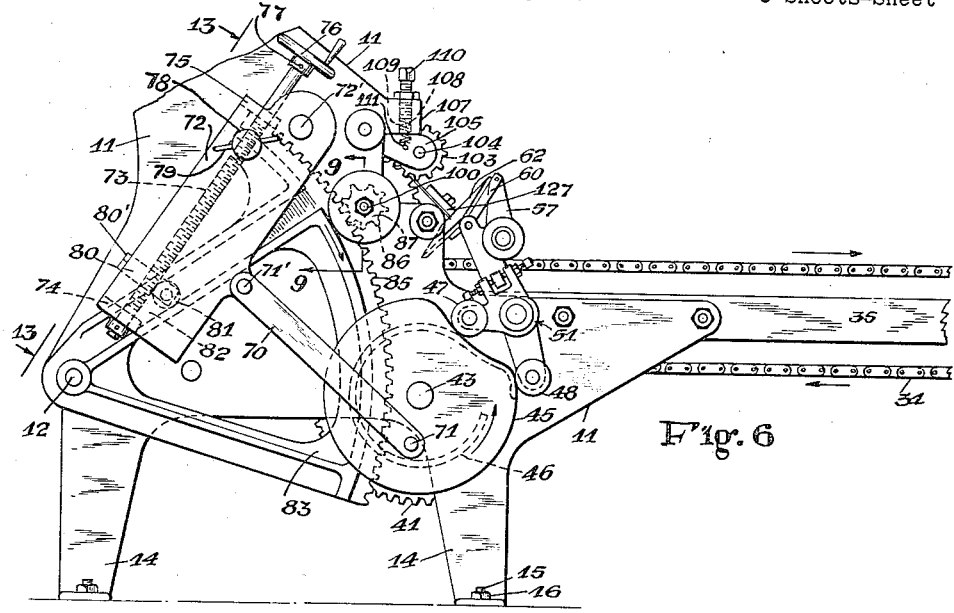
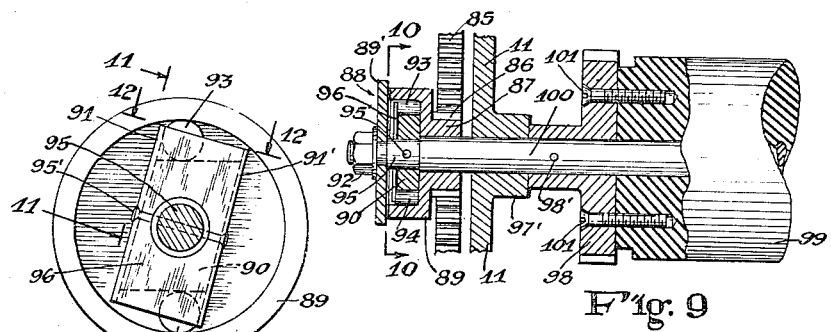
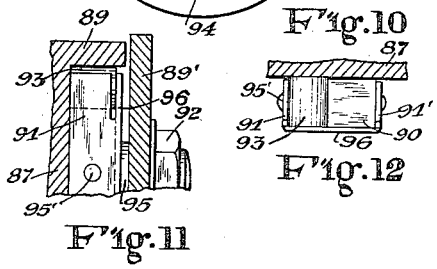
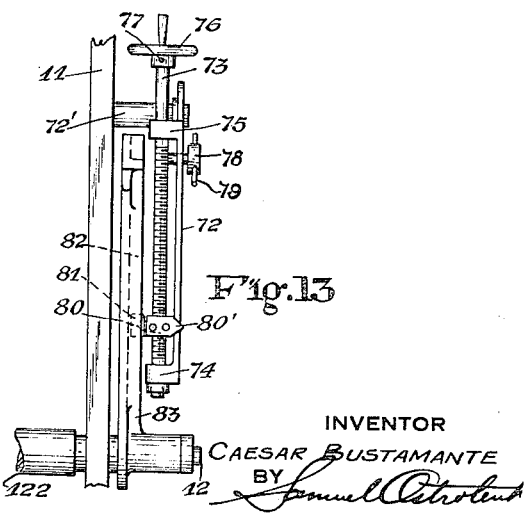
INVENTOR
CAESAR BUSTAMANTE
BY
ATTORNEY

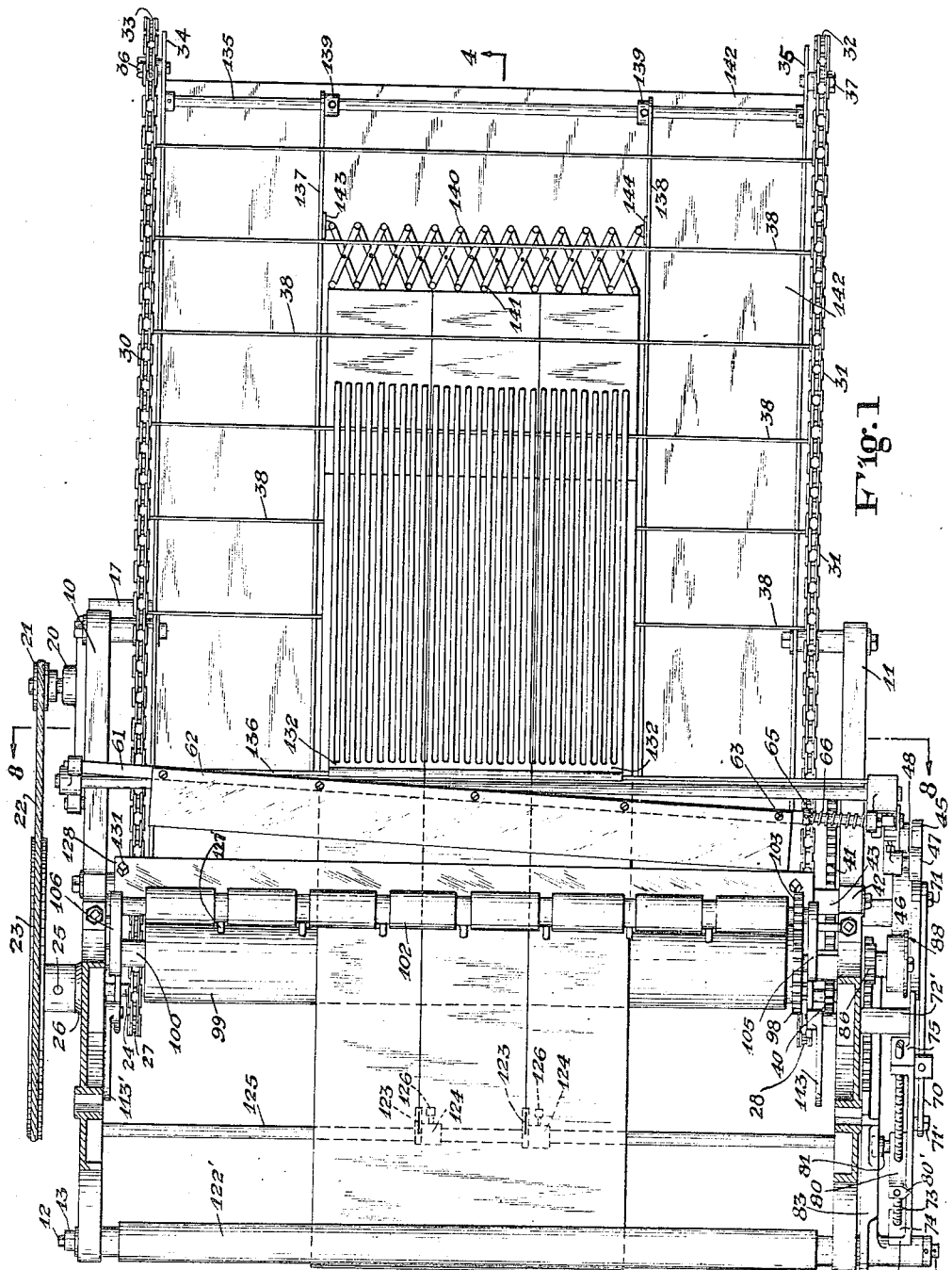

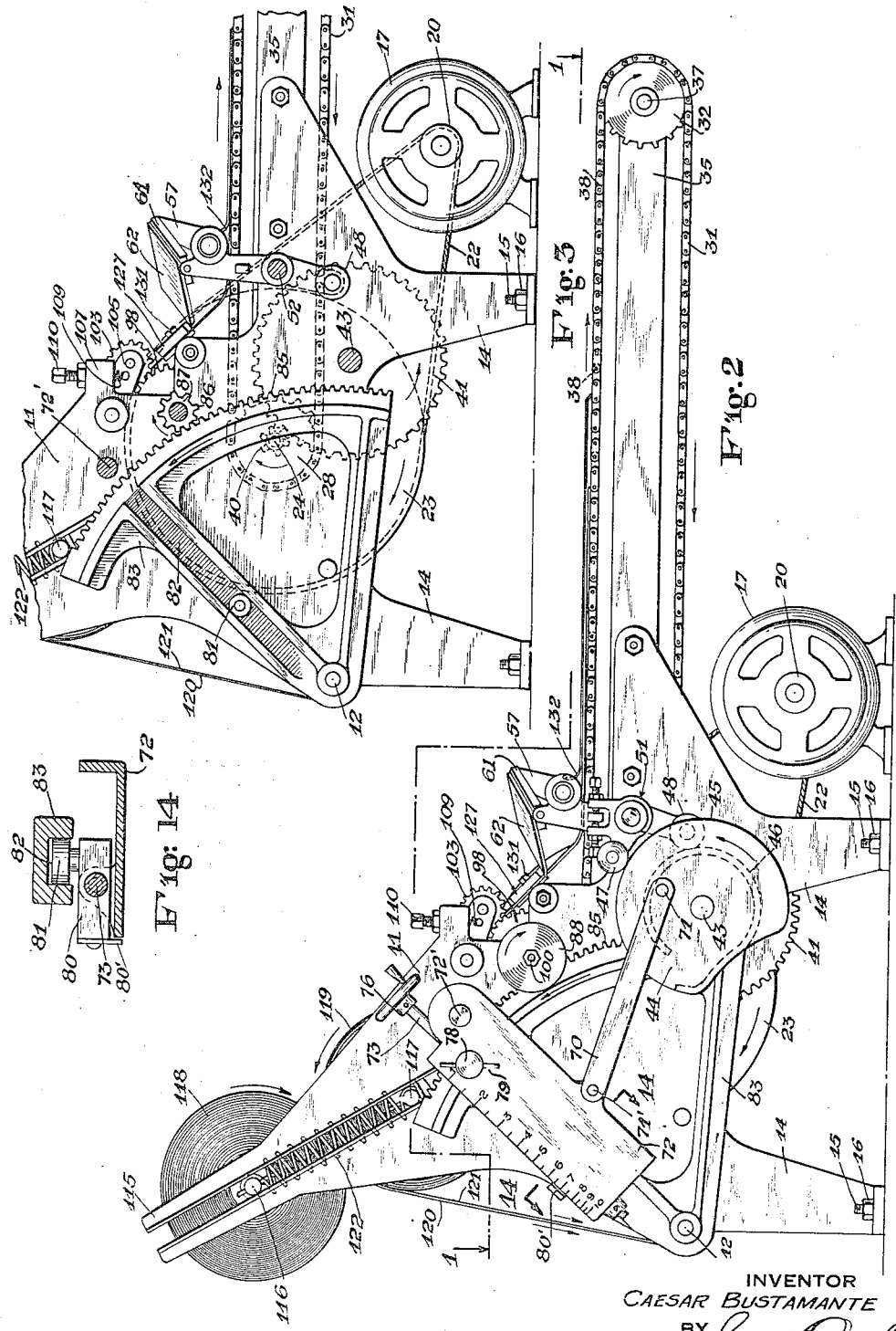

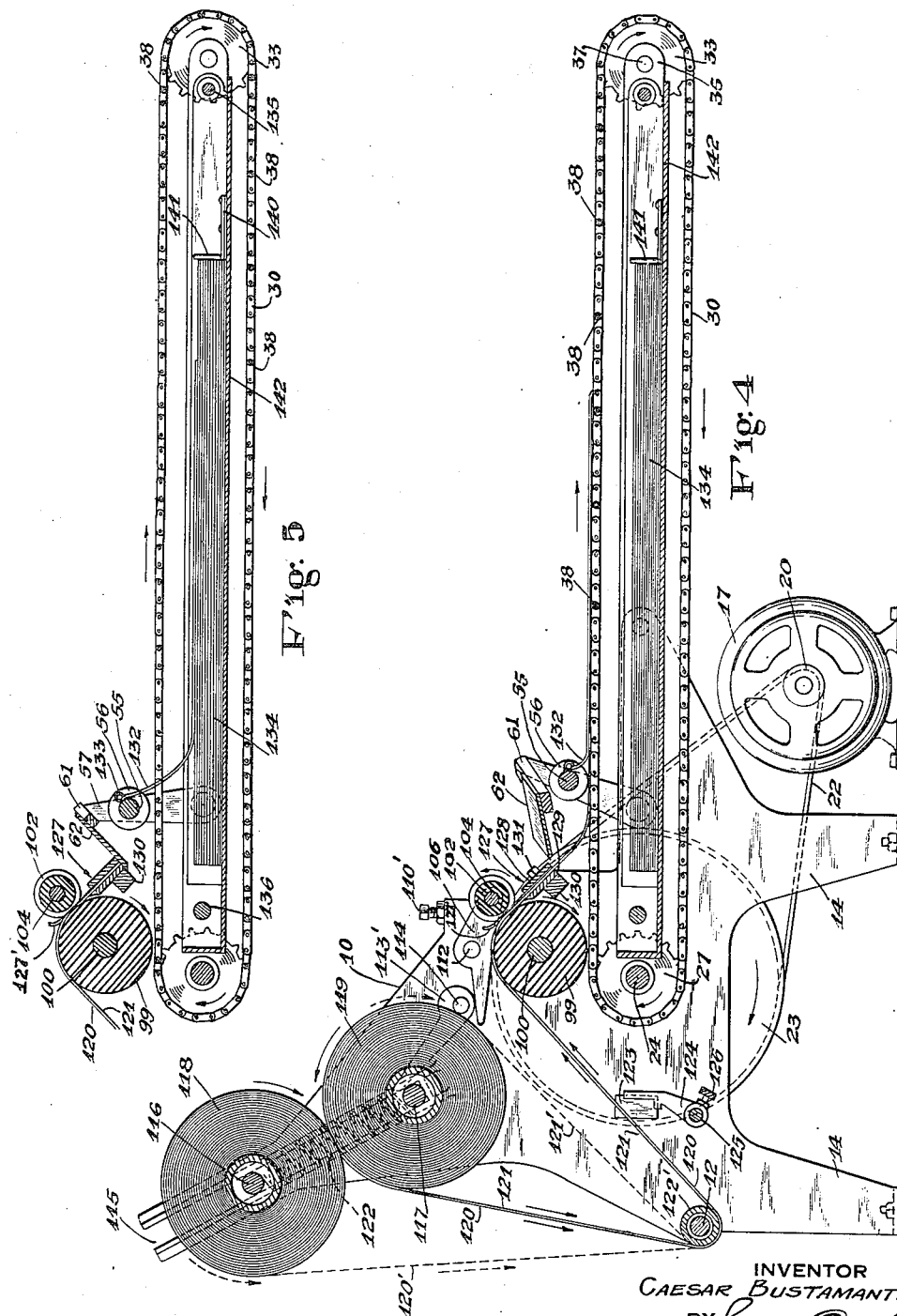

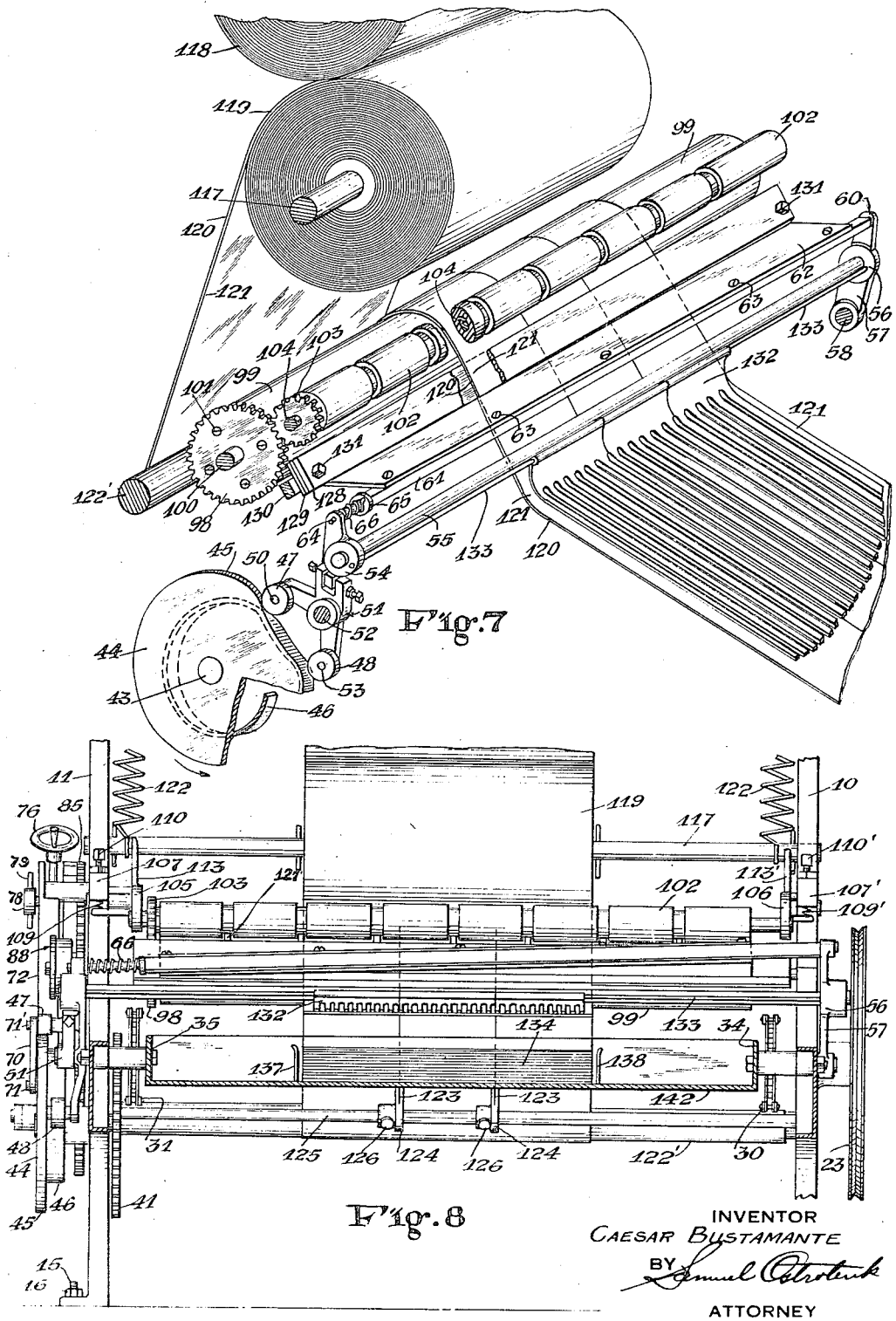

Patented Aug. 20, 1935

2,011,614

UNITED STATES PATENT OFFICE 2,011,614

CUTTING AND SLITTING MACHINERY

Caesar Bustamante, New York, N. Y.

Application May 11, 1934, Serial No. 725,106

2 Claims. (Cl. 164—43)

My invention relates to novel apparatus for and methods of cutting and slicing material fed from rolls, and more particularly relates to novel apparatus for and methods of cutting and slicing cellulose products.

Due to the close texture of cellulose products and its resultant resistance to tearing, shearing and cutting, the usual methods such as commonly employed in cutting paper cannot be readily adapted thereto.

There are many different types of cellulose products in the class to which my invention applies. Such types may be sheets that are moisture-proof, dust-proof and translucent. They may be obtained in large rolls, printed or plain, as desired. A common term that is descriptive of this class is "Cellophane". However, hereinafter I shall refer to these products by the term "cellulose".

The considerable increase in use of these products has created a need for simple, inexpensive and effective means to enable the large consumer of these products to cut and slice the cellulose to varying sizes.

To make it practical, however, for the consumer to have such a machine, it is essential that the investment, interest and operation costs, when added to the cost of the cellulose material bought in bulk, amount to the same or less than the cost of the material purchased cut to size. If this can be accomplished, there are so many inherent advantages in being able to cut the material at the time of consumption that the purchase of such a machine is well warranted. Such material, for instance, generally sticks together at the edges when kept in stock in cut form.

My invention contemplates the construction of a device which, while meeting all the technical and intricate details in the cutting and slicing of cellulose sheets, is simple, constructed of few inexpensive parts so that it is not costly, consumes a small amount of space, operates with comparatively little power and is in the main automatic, eliminating the need of any special skill.

Accordingly objects of my invention are to provide a cutting and slitting machine which is inexpensive, simple and economical to operate and adjustable to cut any desired size.

Cellulose is extremely light and has substantially little body. Its edges, accordingly, tend to crimp and the material as a whole to curl. In feeding the cellulose from the rolls, it is accordingly essential to maintain the product taut while at the same time not subjecting too severe a strain on the rolls from which it is being fed.

To this end I provide novel means for simultaneously feeding the cellulose product from rolls on which it is carried and at the same time provide for rotation of the rolls to assist in the feeding.

Accordingly an object of my invention is to provide a novel method of and apparatus for feeding cellulose sheets from one or more rolls.

A further object of my invention is to provide novel means whereby the drive rollers are in engagement with the rolls containing the cellulose sheets so that as the sheets are fed therefrom by the rollers and the rolls are simultaneously rotated to assist in the feeding, the sheets being fed are at all times maintained taut to permit uniform slitting thereof.

Still a further object of my invention is to provide novel means for automatically slitting the cellulose sheets longitudinally as they are fed for cutting operation.

Due to the tendency of the cellulose sheets to crinkle and otherwise distort themselves in shape, it is essential in the feeding operation to suitably protect the ends of the material and at the same time to hold the material in fixed relation to assist in the cutting operation.

Moreover, because of the special problems involved, it is essential that the cellulose sheets be brought to a positive rest at the instant of cutting.

Accordingly, a further object of my invention is to provide novel methods of and apparatus for gripping the material to be cut and guiding it over a fixed path as it is fed to a predetermined length prior to cutting.

A further object of my invention is to provide novel means for gripping the cellulose sheets and rigidly holding them in place during the period while the cutting knife is in engagement therewith.

A still further object of my invention is to provide a novel arrangement of aprons which cooperate with transverse rods to hold the cellulose sheets in gripping engagement during the feeding and cutting thereof.

In an intermittent feed of the material to be cut which operates from the same shaft supplying power to operate the knife, a definite relationship must invariably be maintained between the feeding of the material and the cutting such that cutting occurs only while the material is at rest and feeding occurs only while the knife is out of engagement therewith. In such a construction the adjustment of the size of cuts, while maintaining this relation usually involves complicated and costly mechanism.

In accordance with my invention, I have simplified this materially by a novel arrangement of material feeding mechanism and adjusting means therefor.

Accordingly a further object of my invention is to provide novel apparatus for and methods of feeding the material to be cut.

Another object of my invention is to provide novel apparatus for and methods of adjusting the size of cuts.

Still a further object of my invention is to provide novel means for cutting various sized lengths of material while maintaining a definite relationship between the feed and cutting operations.

Still another object of my invention is to provide a novel sector gear construction with adjustments therefor to control its oscillatory movement.

In feeding material from rolls and providing for the rotation of the rolls to assist in feeding operation through frictional engagement with the rolls, it becomes necessary to compensate for adjustments in diameter of the rolls as the amount of material thereon is reduced.

Accordingly a further object of my invention is to provide novel apparatus for and methods of rotating the rolls to assist in the feeding of the material therefrom and to simultaneously adjust for changes in the diameter of the rolls as the amount of material left thereon is decreased.

There are other objects of my invention which together with the foregoing will appear in a detailed description which is to follow in connection with the drawings in which:

Figure 1 is a top view of my invention with a section through the roller end as indicated in Figure 2;

Figure 2 is a side view of my invention during the feeding of the cellulose sheets;

Figure 3 is a side view to show how the several gears mesh;

Figure 4 is a longitudinal section through my invention (as indicated in Figure 1 by 4—4) to show the path of the cellulose sheets through the machine;

Figure 5 is a part of Figure 4 to illustrate how the finally cut wrappers are stacked;

Figure 6 is a side view to show the coordination of the gears and cams during the transverse cutting of the sheets;

Figure 7 is a pictorial view of the path of the cellulose sheets and of the associated mechanisms;

Figure 8 is a transverse section through the machine as indicated in Figure 1 by 8—8;

Figure 9 is a section through the clutch member 88 as indicated in Figure 6;

Figures 10, 11, and 12 are detail sections of the clutch; and

Figures 13 and 14 are sections through the length of wrapper control mechanism.

Referring to the drawings and more specifically to Figure 1, the two side frames 10 and 11 are spaced apart as desired and structurally strengthened by tie rod 12 which locks the frames into a solid unit by means of nuts 13. Where necessary, legs 14 of the frames 10 and 11 may be secured to the supporting surface by means of bolts and nuts 15 and 16 respectively (Figure 4).

Suitably mounted on the frame structure is a source of rotating power preferably an electric motor 17 of desired power. The motor 17 is provided with the usual armature suitably mounted for rotation in bearings 20 and having secured at one end thereof a pulley 21 upon which rides a belt 22, transmitting the driving power to a larger pulley 23. Pulley 23 secured for rotation with shaft 24 by means of a set screw 25 is mounted on an extension of the shaft 24 beyond the outer side of the frame 10.

Shaft 24, supported by the frames 10 and 11 in bearings 26, carries fixedly mounted thereon and close to the frames 10 and 11 a pair of sprocket wheels 27 and 28 which carry a pair of endless chains 30 and 31. The endless chains 30 and 31 extend horizontally to an additional pair of similar sprocket wheels 32 and 33 which are spaced a suitable distance from the wheels 27 and 28, dependent upon the maximum length of cellulose wrapper it is desired to cut. The secondary pair of sprocket wheels 32 and 33 are rotatably mounted on sub-frame 34 and 35 in bearing supports 36 and 37. The sub-frame 34 and 35 carries the receiving and stacking assembly of the cellulose wrappers and will be explained more fully hereinafter.

The sprocket chains 30 and 31 carry several transversely mounted rods 38 upon which the finally cut cellulose wrapper is received and supported preliminary to stacking, as will also be explained further hereinafter.

The sprocket wheels 27 and 28 being fixedly mounted on the rotating shaft 24 and of identical size, drive the sprocket chains 30 and 31 at equal speeds with respect to each other. Accordingly, the supporting rods 38, carried by the sprocket chains 30 and 31, are maintained at right angles to the chains.

Secured at the end of the supporting shaft 24 for rotation therewith and between the frame 11 and the sprocket wheel 28 is fixedly mounted a pinion 40 (Figure 3) which meshes with and drives a gear 41 secured to and driving shaft 43, supported by the frame 11 in bearing 42.

Mounted on and rotatable with shaft 43 (Figure 2) is a cam member 44. This cam has two cam surfaces 45 and 46 upon which ride the cam rollers 47 and 48 respectively. As shown clearly in Figure 7, cam follower 47 rides on the cam surface 45 and cam follower 48 rides on the cam surface 46. It will be obvious from this drawing that as cam 44 rotates counterclockwise, cam follower 48 moves over the raised portion of cam surface 46, cam follower 47 passes over the depressed portion of cam 45 and bell crank 51 is rocked in a counterclockwise direction. Also, as cam follower 48 reaches the end of the raised portion of the cam, it is returned to the position shown in Figure 2 by cam follower 47, which rides over the raised part of cam 45, rocking the bell crank 51 clockwise.

The bell crank 51 is pivotally mounted on pin 52 which is integral with frame 11. Cam follower 47 is rotatably mounted on pin 50, and cam follower 48 on pin 53, attached to the bell crank 51.

As the cam 44 rotates in a counterclockwise direction about its shaft 43, bell crank 51 is rocked clockwise and counterclockwise about its pivot 52 once per cam revolution, as hereinbefore described. Proper design of cam 44 permits predetermination of the bell crank's cycle of operation.

As will be described in detail hereinafter, the oscillatory motion of the bell crank operates to oscillate the knife which cuts the cellulose sheets. This construction provides a positive control of the knife structure, avoiding the necessity of having springs for the cam followers and at the same time makes for simpler and cheaper construction of the cams.

Referring to Figure 7, bell crank 51 extends upwardly and forms a bearing support 54 for a transversely extending shaft 55 which extends across the machine and is supported by a similar bearing 56 integral with crank 57 pivoted about a pin 58 integral with the frame 10.

Integral with the crank 57 is a bearing 60 in which square shaft 61 is rotatably mounted. Upon the shaft 61 is mounted a cutting knife 62 which extends transversely across the machine and is riveted to the shaft 61 by means of rivets 63.

Shaft 61 is supported at its opposite end by the bearing 64 in which it is also rotatably mounted. Bearing 64 is integral with bell crank 51. Located near bearing 64 is a collar 65 mounted on the shaft 61 and having secured thereto one end of a spring 66 encircling the shaft 61. The other end of the spring is secured to the support 64. This spring 66 normally urges the knife blade 62 against the cutting guide structure 127, as will be hereinafter explained.

It will now be obvious that as the bell crank 51 is rocked back and forth when the cam followers are operated by their respective cams, the knife shaft 61, together with the knife blade 62 pivotally mounted thereon, and the shaft 55, is rocked back and forth on pivots 52 and 58. The knife blade 62, being pressed against guide 127 by spring 66 this is reciprocated for the cutting action.

As is now about to be explained, while the knife is in its topmost position, due to cam follower 47 moving over the raised portion of cam 45, a predetermined amount of the cellulose sheets is fed under and past the knife. At the completion of this feed, the cellulose sheets are brought to a stop and the cam follower 48, passing over the raised portion of cam 46, rocks the knife shaft and knife blade counterclockwise into cutting position, during which movement the cellulose sheets are cut to a length determined by the amount which has been fed into position.

It will now be obvious that the timing between the operation of the knife and the feeding of the cellulose sheets is such that the cutting occurs immediately after the cellulose sheets have been fed forward a predetermined length and brought to a stop, and that thereafter as soon as the knife is removed, a further predetermined length of cellulose sheets is fed forward. This action will now be explained in detail.

Referring to Figures 2 and 6, there is shown a rod 70 connected to the outer face of cam 44. It will be recalled that the shaft 43 is continually rotated and carries with it cam member 44. The outer face of cam 44 is disk-shaped. One end of the rod 70 is pivoted on the cam at 71 and the other end is similarly pivoted in member 72 at 71'.

Frame 72, pivotally mounted at 72' in the frame 11, functions as will be described, to transfer power from shaft 43 for feeding predetermined lengths of the cellulose sheets between each cutting operation. The length fed per cycle is varied by adjusting member 72 and is indicated by the pointer 80' at the graduated scale thereon.

Rotatably mounted in member 72 is a screw 73 (see Figures 6 and 13) supported in bearings 74 and 75 forming part of the member 72. At the head of the screw is a handle 76 fixedly mounted by means of set screw 77 and operating to permit manual rotation of the screw 73.

A guide 80 is mounted on said screw 73 between the bearings 74 and 75 of the member 72 and is internally threaded so that a movement of the screw 73 will cause the guide 80 to move up or down on the screw 73, depending on the direction of rotation of said screw. Set screw 78, set in member 72 (Figure 13) is manually rotated by means of cross rod 79 to hold screw 73 in any desired setting. Secured to guide 80 for maintaining its transverse position while moving up and down is a stud 81 integral with guide 80 and operating in a slot 82 of the sector gear 83 (Figure 14).

The sector gear 83 is pivotally mounted onto the frame 11 on shaft 12. Thus the rotary movement of the cam 44 will communicate its motion to the connecting rod 70, operating the member 72, carrying with it the screw 73 and guide 80. The arc that the guide 80 describes in its reciprocating motion depends on the portion of member 72 with which it is in engagement; that is to say, its distance from the pivot shaft 72' to which it has been adjusted as indicated by pointer 80' on the scale. Guide 80 through stud 81 in slot 82 will cause the sector gear 83 to operate in a reciprocating motion, the amplitude of the arc through which sector gear 83 is rocked in turn depending on the amplitude of the arc made by guide 80 which in turn depends upon the distance that the stud 81 is from the pivot 72'. The relative changes in these two values is made such that a gradual change in the excursion of sector gear 83 is effected as the stud 81 is moved from one to the opposite end of the slot 82 by the screw 73. The calibrated scale at the edge of member 72 serves to permit one to adjust the mechanism for any desired length of wrapper.

The sector gear 83 contains a series of gear teeth 85 on its outer periphery which mesh with and operate teeth 86 of the pinion 87 which is rotatably mounted on shaft 100, as shown in Figure 6. As the sector gear 83 rotates in a counterclockwise direction, the pinion 87 is operated in a clockwise direction and vice versa. Pinion 87 has a projecting circular hollow flange 89 (Figure 9) which forms a housing for the clutch member 88. A block 90 is fixed to, for rotation with, shoulder 95 near the end of shaft 100, by means of a pin 95' (Figure 10). Two metal stops 91 and 91' are fastened to block 90 and project beyond its sides at diametrically opposite ends to cooperate with metallic rollers 93 and 94, as hereinafter described.

The internal diameter of the flange 89 is large enough to permit its free revolution about the two stops 91 and 91'. A rectangular plate 96 is fixed against block 90 to enclose the rollers 93 and 94 as shown in Figures 9 to 12. These rollers are thus constrained to move along corresponding sides of block 90. A cap 89' attached to the end of shaft 100 by nut 92 completes the housing for the clutch member 88.

When the pinion 87 is rotated in a clockwise direction by sector gear 83, the rollers 93 and 94 become wedged between the block 90 and the cylindrical flange 89. They jam themselves into the position to cause a lock between the block 90 and the flange 89 and thereby permit transfer of power from pinion 87 to the shaft 100.

When the pinion 87 is driven counterclockwise, the rollers 93 and 94 occupy the position shown in Figure 10. They rest against the metal strips 90 and 91 which act as flexible stops. The internal diameter of the flange 89 is large enough to not be able to contact the rollers 93 and 94 when they are in this position. There is thus no locking action between the pinion 87 and shaft 100 and therefore no power transfer.

Accordingly, as sector gear 83 is moved counterclockwise in its cycle, it transfers power to rotate shaft 100 and as sector gear 83 is moved clockwise it does not transfer power to shaft 100 which therefore does not rotate then. The shaft 100 (Figure 9) is suitably mounted in bearing 97 of frame 11 and in bearing 97' of frame 10 (the latter shown in Figure 1). A gear 98 is secured to, for rotation with, shaft 100 by set screw 98'. A resilient cushion roller 99 is attached to gear 98 with screws 101.

Referring to Figure 7, cushion roller 99 is in tangential relation to pressure cushion roller 102. This pressure roller is rotated by the attached gear 103 which meshes with gear 98 of the cushion roller 99. The shaft 104 of the pressure roller 102 is rotatably mounted in levers 105 and 106, as shown in Figure 1. The continuously rotating member 17 is thus caused to intermittently rotate the cushion roller 99 together with pressure roller 102, which rollers act as drive rollers to intermittently feed the cellulose sheets through the machine. The number of whole or fractional revolutions of the drive rollers is proportional to the arc traced by the sector gear which drives the one-way clutch. The length of the intermittently fed sheets depends, therefore, on the setting of the pointer 80' on the calibrated scale and is actuated indirectly by motor 17 which rotates continuously. The angle of revolution of drive rollers 99 and 102, therefore, depends directly upon the excursion of the sector gear and determines the length of sheets fed per cycle.

Extending from the frame 11 is an extension 107 (Figure 6) containing an aperture 108 within which a compression spring 109 is located. Under the action of bolt 110, spring 109 is compressed. The stud 111, which is integral with lever 105, is attached to the end of spring 109. By changing the compression of spring 109, the tension between the two rollers 99 and 101 can be controlled. As seen in Figure 8, there is a similar arrangement at the opposite end of the roller 102, namely lever 106, extension 107', compression spring 109' and bolt 110'.

Lever 106 is pivotally mounted on frame 10 by pin 112 (Figure 4). Cam lever 113' is rotatably mounted on frame 10 by pin 114. A manual clockwise rotation of cam lever 113' causes lever 106 to turn counterclockwise, thereby raising the pressure roller 102 against the force of the compression spring. There is a corresponding lever arrangement on the opposite end at frame 11 as seen in Figure 8, namely cam lever 113 mounted to act with lever 105.

Thus a pull on levers 113 and 113' raises pressure roller 102 and permits the insertion of the cellulose sheets when setting up. Adjustment of bolts 110 and 110' is made for any desired pressure between the rollers 99 and 102 which act to drive the cellulose sheets through the machine. The pressure roller 102 may be built up in sections, as seen in Figure 7, to better concentrate the pressure locally upon the strips of cellulose.

The frame members 10 and 11 have projecting tracks 115 (Figure 2) between which are set the shafts 116 and 117, holding the cellulose rolls 118 and 119. Spring 122 joins the corresponding ends of the shafts 116 and 117 and acts to draw them together. This action, as shown in Figure 4, keeps the two adjacent cellulose rolls in constant frictional engagement despite their diminishing diameters when they are being used. Such contact of the rolls is desirable to prevent unrolling of cellulose during that portion of the cycle when no cellulose sheets are being drawn. Furthermore, a proper tension is thus imparted to the cellulose sheets 120 and 121 as they pass from their respective rolls 118 and 119 around guide roller 122' (set on shaft 12), past the slitter knives 123 (set in holders 124 and mounted on rod 125) and thence between the drive rollers 99 and 102. The sheets are taut and thus are easily slit.

I have provided guide strips 127' (Figure 8) at the points the sheets are fed between the drive rollers. These are flexible strips mounted to assist in the passage of the cellulose sheets between said drive rollers.

There is one slitter knife 123 for each slit that is to be cut along the cellulose sheets (Figure 1). Each slitter knife may be set in any desired position along rod 125 by means of a thumb screw 126 in the knife holder 124.

Assistance to the feeding of the cellulose sheets from the rolls may be arranged by placing in frictional relationship the bottom of the lower cellulose roll 119 and the cushion roller 99. We can keep this relationship constant if two springs are attached to the ends of their corresponding shafts (similar to springs 122 for the roll shafts). Thus the frictional engagement of the two rolls 118 and 119 and the cushion roller 99 is maintained despite the diminishing diameter of the rolls as feeding progresses.

These frictional contacts seem to keep the sheets taut, but permit regular feeding without subjecting the material to excessive strain. The two rolls are simultaneously rotated to assist in the feeding by the drive rollers. In the machine I am discussing I have chosen not to engage the rolls and rollers in this manner, for the sake of simplicity. Nevertheless, the principle as stated is clear and easily applicable when the design of a given machine necessitates it.

Referring again to Figure 4 we notice that the contacting rolls 118 and 119 necessarily rotate in opposite directions. If roll 118 rotates clockwise (solid arrows), roll 119 will rotate counterclockwise, and the sheets 120 and 121 will be fed as illustrated. However, if the sheets are fed as shown by dotted lines 120' and 121', roll 118 will rotate counterclockwise and roll 119 will rotate clockwise. The action on the sheets past guide roll 122 is, however, unchanged.

I do not wish to be limited to the use of only two rolls of cellulose. As many more rolls could be mounted in extensions of tracks 115 as we may design the machine to carry. Springs similar to springs 122 will then hold adjacent rolls in contact. The sheets will be drawn from the top or bottom of each roll corresponding to the direction of rotation of that roll and then brought together around the guide roll 122. The action from here on is identical to the case we are discussing.

A guide structure 127 (Figure 7) consists of two identical metal strips 128 and 129 held in position on shaft 130 by bolts 131. Shaft 130 is secured to the frames 10 and 11. The two plates 128 and 129 are mounted parallel to the sheets 120 and 121 which pass between them. The space between these plates is fixed and maintained to permit easy passage of the sheets.

The edges of the plates 128 and 129 which are adjacent to the knife blade 62 serve to guide this knife in a transverse relation to the sheets during the cutting operation. The knife 62 is urged against the guide plates by the spring 66, as hereinbefore described. Therefore, despite the fact that the shaft 61, holding the knife 62, describes a circular reciprocating motion, the cutting edge of the knife 62 which presses against guide plates 128 and 129 will reciprocate linearly.

As seen in Figure 1, the knife 62 is mounted at an angle to the sheets. The knife thus starts its shearing action at the right side of the sheets, and then progressively cuts along the sheets towards the left side. A clean cut is thus effected with a minimum shearing force. The guide structure 127 serves to hold the edges of the sheets and to guide the blade 62 during the cutting operation. The lower right corner of the blade 62 is designed to rest against the guide structure 127 when the knife is in its uppermost position so that the knife will at all times be guided in its linear reciprocating cycle.

The sheets 120 and 121 continue past the guide structure 127 onto the cross rods 38 (Figure 1) which are carried in the sprocket chains. They pass under a set of aprons 132 (Figure 7). I have successfully used aprons made of leather, although other materials may be used. The leather is cut into thin strips to reduce the weight of, and add flexibility to, these aprons. They are mounted on a rod 133 (Figure 7) which is secured to bearings 54 and 56 of the cutting structure. An adequate number of aprons are placed into position.

One purpose of these aprons is to hold the sheets together and keep them from fluttering, curling, crinkling or otherwise distorting themselves as they progress across the machine. Another purpose is to prevent the wrappers from sliding forward after being cut, by means of the friction of the leather upon them. The principal purpose of the aprons will be described hereinafter.

In Figure 4 the cross rods 38 are moving to the right, still supporting the sheets and aprons horizontally. One revolution of the sprocket chains occurs per cycle of operation. The number and position of these rods 38 is designed so that the first rod engages the front edges of the sheets 120 and 121 at the beginning of the cycle and the last rod just passes these edges as the cutting operation is completed on the shortest length of wrapper the machine is designed to cut. The horizontal support of the cut sheets and of the aprons is then removed, and they, therefore, fall towards the stack 134 which is below. Figure 5 shows the position of the apron 132 on the stack 134 when unsupported by rods 38. As longer lengths of wrapper are cut, the last rods 38 will still support the front portion. In such cases the back portion will fall towards the stack 134 first, and the front will soon be dropped down as rods 38 move away.

The apron 132 serves to guide the cut sheets onto their stack 134. The stack reposes in an adjustable enclosure attached to the sub-frame 34 and 35 by shafts 135 and 136. The side plates 137 and 138 (Figure 8) are mounted on these shafts by collars 139 (Figure 1) and may be moved along the shafts to accommodate for any sheet width used. The forward end support is made up of a series of pins 141 projecting from the inner joints of pantograph hinge 140. This hinge is slidably mounted on the side plates 137 and 138 at its ends 143 and 144. Thus, when the position of the side plates is changed, the width of the pantgraph hinge 140 changes correspondingly. The longitudinal position of this hinge 140 may be adjusted along the side plates to set the projecting pins 141 against the end of any length of sheet that is to be cut. The bottom of the stack rests on a metal sheet 142 which is integral with or mounted to the bottom edges of the sub-frame members 34 and 35 (Figures 1 and 8).

Having hereinbefore discussed the component actions of my machine independently, I shall now describe the cycle of operations to indicate how I have coordinated them to automatically cut and stack cellulose wrappers of any desired length or width from rolls of cellulose.

The rolls of cellulose are set in the tracks 115 and the sheets are drawn around guide roller 122′, past slitter knives 123, and then between the drive rollers 99 and 102 to the guide structure 127 in a manner already described. The position of pointer 80′ is set for the desired length of wrapper, and the slitter knives 123 are set for the desired width. The stack enclosure is adjusted for proper length and width.

The motor 17 continuously drives pulley 23 (Figure 3) clockwise which rotates sprocket chains and pinion 40 clockwise. Pinion 40 meshes with gear 41 to drive cam 44 (Figure 2) counterclockwise at a lower speed than the sprocket wheels. The sprocket chains make one revolution per revolution of the cam 44. When cam 44 is in the position shown in Figure 2, the bell crank 51 is supported so that it holds the knife structure away from its cutting position, and sector gear 83 is moving counterclockwise. Clutch member 88 is thus rotated clockwise and, being engaged, rotates cushion and pressure rollers 99 and 102 to draw cellulose sheets 120 and 121 forward through the machine. The sheets pass onto the transverse supporting rods 38 which are in a position to meet the edges and ride between these rods and the aprons 132. This action continues until sector gear 83 has reached the end of its counterclockwise excursion.

On the clockwise return movement of the sector gear 83, clutch 88 is disengaged from drive rollers 99 and 102 in a manner hereinbefore explained, and the sheet feeding therefore ceases. Cam 44 is now entering the last portion of its revolution (Figure 6) and cam surfaces 45 and 46 urge bell crank 51 counterclockwise, operating the knife structure to cut the stationary sheets transversely at a proper length. When the cutting stroke is completed, the supporting rods 38 are moving from under the sheets which now fall to the stack 134 below, guided by a flapping motion of the leather aprons 132 which also prevent the sheets from sliding forward.

At the end of the cycle, cam 44 moves bell crank 51 clockwise to carry the knife structure away from action. Cam 44 has now made one revolution and the cycle of operation is completed. This cycle is repeated as sector gear 83 is again moved counterclockwise to start the feeding of the sheets through the machine.

I have described mechanisms and their coordination to accomplish the objects of my invention. I have described means whereby cellulose sheets from one, two or more rolls of any width may be cut into any desired length and width of wrapper and stacked in one operation or cycle. It is obvious that other forms and different combinations of mechanisms may be constructed to perform these operations. For example, various shapes or types of the cam member and its cam followers may be used; aprons of other materials or design are feasible; a different form of bell crank or cutting structure may be devised; various methods of continuous drive may be employed.

Accordingly, I do not intend to be limited except as set forth in the appended claims.

I claim:

1. In combination; a source of power; material to be cut; means controlled by said source of power for feeding said material in predetermined lengths to be cut; an oscillating knife operated by said source of power and in timed relation with said last-mentioned means for cutting said materials in lengths determined by said feeding; gripping means operated from said source of power for gripping the said material as it is fed forward for maintaining the edge taut during the cutting operation; and means operative following the cutting of the material for stacking the material, said gripping means returning to grip the new end of the material as it again is being fed, said stacking and gripping means comprising a plurality of aprons and a plurality of rods mounted on continuous chains, said material being fed between said aprons and said rods and gripped therebetween.

2. In combination; a source of power; means operative from said source of power for feeding cellulose sheets; a slitting knife; means operated from said source of power for feeding said cellulose sheets past said slitting knife for slitting said material longitudinally; means for intermittently stopping said feeding means; means operated during said stopping interval for cutting material transversely; means operative following the cutting of the material for stacking the material; and a stack enclosure adjustable for any size of stack, said enclosure consisting of two side plates connected by a pantograph hinge with pins projecting from the joints of said hinge.

CAESAR BUSTAMANTE.